United States Patent
Lagsdin

(12)
(10) Patent No.: US 6,270,119 B1
(45) Date of Patent: *Aug. 7, 2001

(54) STABILIZER PAD FOR VEHICLES

(76) Inventor: Andry Lagsdin, 54 King Hill Rd., Hanover, MA (US) 02339

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,473

(22) Filed: Oct. 30, 1998

(51) Int. Cl.$^7$ ........................................ B60S 9/02
(52) U.S. Cl. ........................ 280/764.1; 212/304
(58) Field of Search .............. 280/763.1, 764.1, 280/765.1, 766.1; 248/632, 633, 188.8, 188.9, 677; 212/301, 304

(56) References Cited

U.S. PATENT DOCUMENTS

| | | |
|---|---|---|
| 2,277,939 | 3/1942 | Thalhammer . |
| 3,219,362 | 11/1965 | Epstein . |
| 3,244,301 | 4/1966 | Vaughan . |
| 3,495,727 | 2/1970 | Long . |
| 3,642,242 | 2/1972 | Danekas . |
| 3,721,458 | 3/1973 | Mitchell . |
| 3,897,079 | 7/1975 | MacKenzie et al. . |
| 3,913,942 | 10/1975 | MacKenzie et al. . |
| 3,930,668 | 1/1976 | Schuermann et al. . |
| 4,023,828 | 5/1977 | MacKenzie et al. . |
| 4,039,206 | 8/1977 | Nault . |
| 4,201,137 | 5/1980 | Lagsdin . |
| 4,546,996 | 10/1985 | Hanson . |
| 4,761,021 | 8/1988 | Lagsdin . |
| 4,889,362 | 12/1989 | Lagsdin . |
| 5,050,904 | 9/1991 | Lagsdin . |
| 5,051,057 | 9/1991 | Kremer . |
| 5,054,812 | 10/1991 | Lagsdin . |
| 5,466,004 | 11/1995 | Lagsdin . |
| 5,547,220 | 8/1996 | Lagsdin . |
| 5,564,871 | 10/1996 | Lagsdin . |
| 5,667,245 | 9/1997 | Lagsdin . |
| 5,992,883 | * 11/1999 | Lagsdin ............................. 280/763.1 |

FOREIGN PATENT DOCUMENTS

| | | |
|---|---|---|
| 492912 | 5/1953 | (CA) . |
| 1029715 | 4/1978 | (CA) . |
| 1036148 | 8/1978 | (CA) . |

* cited by examiner

Primary Examiner—Michael Mar

(57) ABSTRACT

The present invention is directed to rotational stabilizer pads for stabilizer arms of vehicles. The stabilizer pads include first and second ground contact faces for contacting respectively a smooth ground surface and a rough or gravel ground surface. In embodiments of the present invention, the stabilizer pads include a reversible resilient pad coupled to a first flange and a second flange. The first and second flanges may include grouser points for engaging the rough ground surface. In embodiments of the present invention, the stabilizer pads are rotated about 135 degrees to change the ground contact face of the stabilizer pad from one of the first and second ground contact faces to the other.

36 Claims, 16 Drawing Sheets

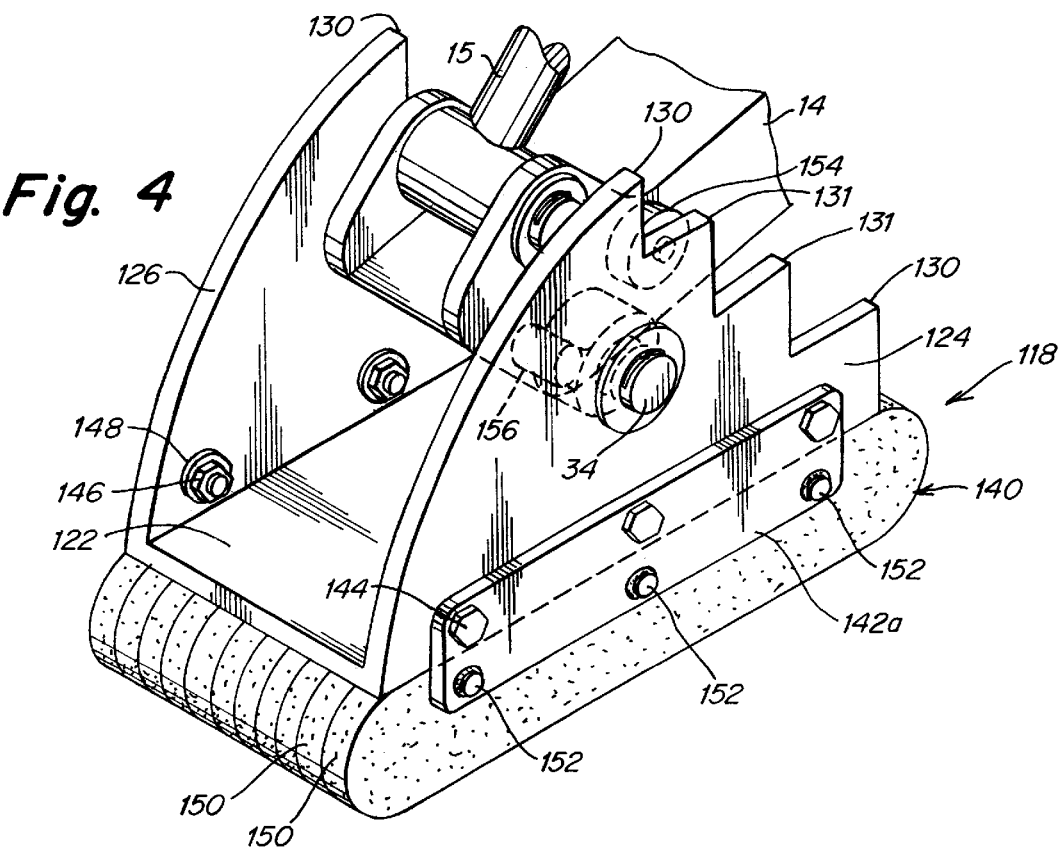
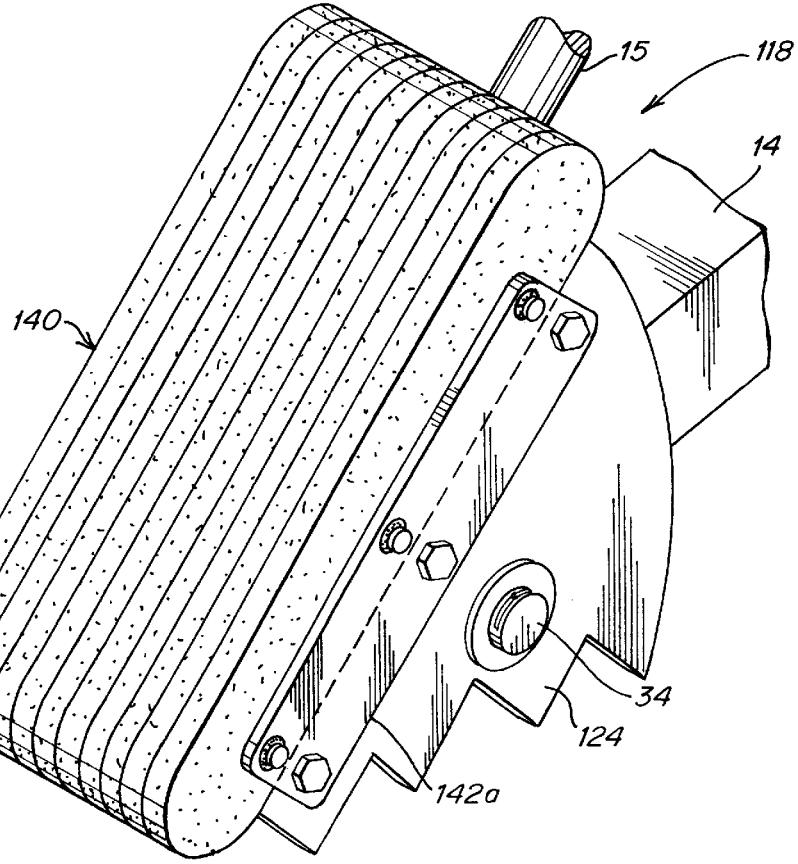

STABILIZER PAD FOR VEHICLES

FIELD OF THE INVENTION

The present invention relates generally to stabilizer pads for vehicles, and more specifically to pivotally mounted, reversible stabilizer pads having a generally flanged first surface for engagement with a soft irregular ground surface such as gravel and having a resilient second surface for engagement with a smooth ground surface concrete or asphalt.

BACKGROUND OF THE INVENTION

FIG. 1 is a fragmentary view of a typical loader/backhoe 10 having a shovel mechanism 12, stabilizer arms 14 and 16, and associated stabilizer pads 18 and 20, respectfully. Hydraulic pistons 15 are used to operate each of the stabilizer arms 14 and 16 independently. In FIG. 1, the stabilizer arms are in an operational, extended position with the stabilizer pads 18 and 20 in engagement with the ground surface to prevent movement of the backhoe during operation of the shovel mechanism 12. When the backhoe 10 is to be moved, the pistons associated with each cylinder are withdrawn so that the stabilizer arms 14 and 16 pivot and raise the stabilizer pads above ground level.

The stabilizer pad 18 of FIG. 1 is shown in greater detail in FIGS. 2 and 3. Stabilizer pad 20 is substantially identical to stabilizer pad 18. The stabilizer pad 18 and similar stabilizer pads are further described in U.S. Pat. Nos. 4,889,362, 5,054,812, 5,466,004, 5,547,220 and 5,667,245, each of which is issued to the inventor of the present application and incorporated herein by reference. The stabilizer pad 18 includes a flat plate 22 having flanges 24 and 26, both extending from one surface of plate 22. The stabilizer pad 18 is also provided with supporting webs or ribs 25, one associated with each flange. The ribs 25 provide additional support for the flanges 24 and 26. The plate 22 is notched at 30 between flanges 24 and 26 as illustrated in FIG. 1. The plate is notched to accommodate the arm 14 and to enable reversible rotation of the stabilizer pad.

The stabilizer arm 14 includes a journal end for accommodating pin 34. Pin 34 also fits within holes of flanges 24 and 26. The pin is used to secure the stabilizer pad to the arm using, for example, a cotter pin as illustrated in FIG. 3.

On the side of the flat plate 22 opposite that containing the flanges 24 and 26 are disposed three laminated rubber pads 40. Each of the rubber pads 40 includes laminated rubber sections supported between angle irons 44 and 48. The angle irons 44 and 48 have a base leg and an upright leg. Each of the upright legs has holes therein for receiving elongated securing pins 50 for containing the laminated rubber sections between the angle irons. The laminated pads 40 are secured to the plate 22 using bolts 53 and nuts 55.

The stabilizer pads 18 and 20 are rotatable about pin 34 when the stabilizer arms are in the raised position to place either the rubber pads 40 downward for engagement with the ground or to place the flanges 24 and 26 downward for engagement with the ground.

In typical operation, the rubber pad side of the stabilizer pad 18 is positioned to engage the ground, as shown in FIG. 1, when the ground surface is a relatively flat hard surface such as concrete or pavement. The flange side of the stabilizer pad 18, as shown in FIG. 2, is positioned to engage the ground when the ground surface is an unfinished ground surface, such as gravel or dirt. The flanges are designed to dig into the unfinished ground surface to anchor and stabilize the backhoe.

Although the prior art, reversible stabilizer pads described above provide reliable operation, it is desirable to provide a simplified stabilizer pad with improved operational performance over the stabilizer pads described above.

SUMMARY OF THE INVENTION

In one general aspect, the invention features a stabilizer pad for use with a stabilizer arm. The stabilizer pad includes a frame having a base plate and first and second flanges extending from a first surface of the base plate. Each of the first flange and the second flange has at least one grouser point to engage a ground surface. The frame, including the base plate, the first flange and the second flange, is formed using a continuous, substantially U-shaped piece of material. The stabilizer pad further includes a resilient pad mounted to a second surface of the base plate, opposite the first surface of the base plate.

The resilient pad can be constructed and arranged such that it covers substantially all of the second surface of the base plate, and the resilient pad can include a plurality of rubber strips. The stabilizer arm can include a pin for rotatably mounting the stabilizer pad to the stabilizer arm, and each of the first and second flanges can include a mounting hole to receive the pin. The resilient pad can be a reversible resilient pad having a first substantially smooth surface to engage a ground surface, and a second substantially smooth surface to engage a ground surface, the first surface being substantially parallel to the second surface. The stabilizer pad can further include a mounting bracket that is constructed and arranged to mount the resilient pad to the frame such that either the first surface of the resilient pad or the second surface of the resilient pad is in contact with the second surface of the base plate. Each of the flanges can have a pair of grouser points to engage a ground surface, and for each pair of grouser points, a first grouser point of the pair can extend a greater distance from the base plate than a second grouser point of the pair. The stabilizer pad can further include means for preventing inadvertent rotation of the stabilizer pad about the pin.

In another general aspect, the invention features a stabilizer pad for pivotally coupling to a stabilizer arm of a vehicle such that the stabilizer pad can rotate about a rotation axis to allow either a first ground contact face of the stabilizer pad or a second ground contact face of the stabilizer pad to engage a ground surface. The stabilizer pad includes a frame having a base plate, a first flange and a second flange, the base plate having a first surface and a second surface, the first and second flanges being coupled to the base plate and extending in a direction substantially perpendicular to the first surface of the base plate. The stabilizer pad further includes a resilient pad mounted to the base plate, the resilient pad extending over substantially all of the second surface of the base plate.

The resilient pad can include a plurality of rubber strips. The stabilizer arm can include a pin for mounting the stabilizer pad to the stabilizer arm, and each of the first and second flanges can include a mounting hole to receive the pin. The resilient pad can be reversible and have a first substantially smooth surface to engage a ground surface, and a second substantially smooth surface to engage the ground surface, the first surface being substantially parallel to the second surface. The stabilizer pad can further include a mounting bracket that is constructed and arranged to mount the resilient pad to the frame such that either the first surface of the resilient pad or the second surface of the resilient pad is in contact with the second surface of the base plate. Each of the flanges of the stabilizer pad can have a pair of grouser points to engage a ground surface, and for each pair of grouser points, a first grouser point of the pair can extend a greater distance from the base plate than a second grouser point of the pair. The stabilizer pad can further include means for preventing inadvertent rotation of the stabilizer pad about the pin. The resilient pad can be formed using at least one rubber strip having a slot formed therein, and the base plate can extend through the slot in the rubber strip.

In yet another general aspect, the present invention features a rotatable stabilizer pad for use with a stabilizer arm. The rotatable stabilizer pad includes a base plate having a first surface and a second surface, the second surface being substantially parallel to the first surface, and first and second flanges, coupled to the base plate and extending from one surface of the base plate. Each of the flanges has a pair of grouser points to engage a ground surface, and for each pair of grouser points, a first grouser point of the pair extends a greater distance from the base plate than a second grouser point of the pair. The stabilizer pad can further include a resilient pad mounted to the base plate, and the resilient pad can have an engaging surface to engage a ground surface, the engaging surface being substantially parallel to the second surface of the base plate.

In another general aspect, the invention features a reversible resilient pad for a stabilizer pad of a stabilizer arm. The resilient pad includes a resilient body portion having a first substantially smooth surface to engage a ground surface, and a second substantially smooth surface to engage a ground surface, and means for coupling the resilient body portion to the stabilizer pad such that either the first surface or the second surface can be selected as a contact surface and be positioned to contact the ground surface. The resilient body portion can include a plurality of rubber strips.

In another general aspect, the invention features a reversible resilient pad for a stabilizer pad of a stabilizer arm. The reversible resilient pad includes a resilient body portion having a first substantially smooth surface to engage a ground surface, and a second substantially smooth surface to engage a ground surface, the first surface being substantially parallel to the second surface. The reversible resilient pad further includes at least one mounting bracket coupled to the resilient body portion for coupling the resilient body portion to the stabilizer pad.

The at least one mounting bracket can include a first bracket mounted to a first side of the body portion between the first surface and the second surface, and a second bracket mounted to a second side of the body portion between the first surface and the second surface. The first bracket and the second bracket can be constructed and arranged to provide reversible mounting of the resilient pad to the stabilizer arm to allow either the first substantially smooth surface or the second substantially smooth surface to contact a ground surface.

In another general aspect, the invention features a stabilizer pad for a stabilizer arm of a vehicle. The stabilizer pad includes means for pivotally coupling the stabilizer pad to the stabilizer arm of the vehicle such that the stabilizer pad can rotate about a rotation axis to allow either a first ground contact face of the stabilizer pad or a second ground contact face of the stabilizer pad to engage a ground surface, a first flange and a second flange, each of which is coupled to the means for pivotally coupling, a resilient pad, and means for coupling the resilient pad to the first flange and the second flange.

The resilient pad can be a reversible resilient pad having a first substantially smooth surface to engage the ground surface, and a second substantially smooth surface to engage the ground surface, the first surface being substantially parallel to the second surface. The means for coupling can include means for arranging the reversible resilient pad such that either the first surface of the resilient pad or the second surface of the resilient pad is positioned to contact the ground surface. Each of the flanges can have a pair of grouser points to engage a ground surface. The means for pivotally coupling can allow rotation of the stabilizer pad such that either the grouser points or the resilient pad is positioned to engage the ground surface. The stabilizer pad can further include means for preventing inadvertent rotation of the stabilizer pad about the axis of rotation.

BRIEF DESCRIPTION OF THE DRAWINGS

For a better understanding of the present invention, reference is made to the drawings which are incorporated herein by reference and in which:

FIG. 4 is a perspective view of a first embodiment of a stabilizer pad of the present invention in a position for engaging a smooth surface;

FIG. 5 is a perspective view of the embodiment of FIG. 4 with the stabilizer pad in a position for engaging a gravel or dirt ground surface;

Figure 1:
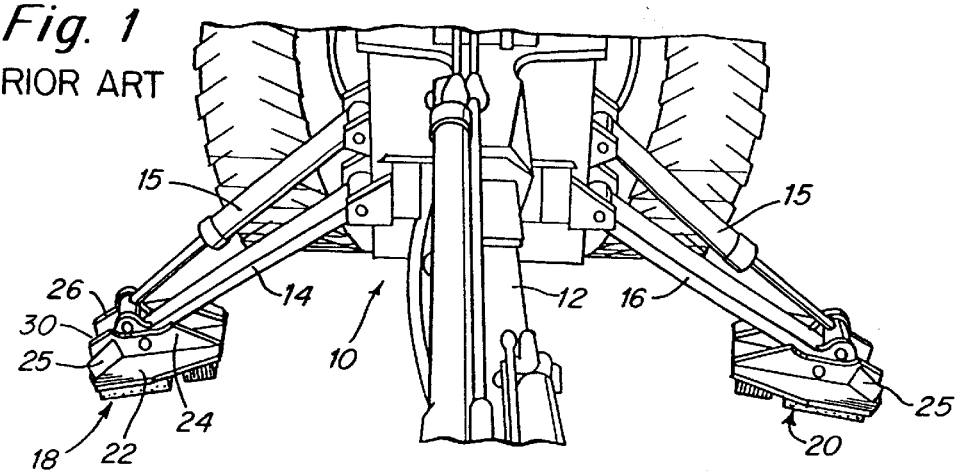
FIG. 1 is a fragmentary view of a typical loader/backhoe having a stabilizer arm with stabilizer pads of the prior art secured thereto.

DETAILED DESCRIPTION preferred embodiment of a stabilizer pad 118 in accordance with the present invention will now be described with reference to FIGS. 4–10. As understood by those skilled in the art, stabilizer pads in accordance with embodiments of the present invention may be used with a backhoe as shown in FIG. 1, and may also be used with other vehicles or platforms having stabilizing members for stabilizing the vehicle or platform.

The stabilizer pad 118 has a substantially U-shaped frame formed in one embodiment from a continuous steel sheet. The continuous steel sheet is bent to form the U-shape consisting of a base plate 122 and flanges 124 and 126. Each of the flanges 124 and 126 has outer grouser points 130 and inner grouser points 131.

Figure 10:
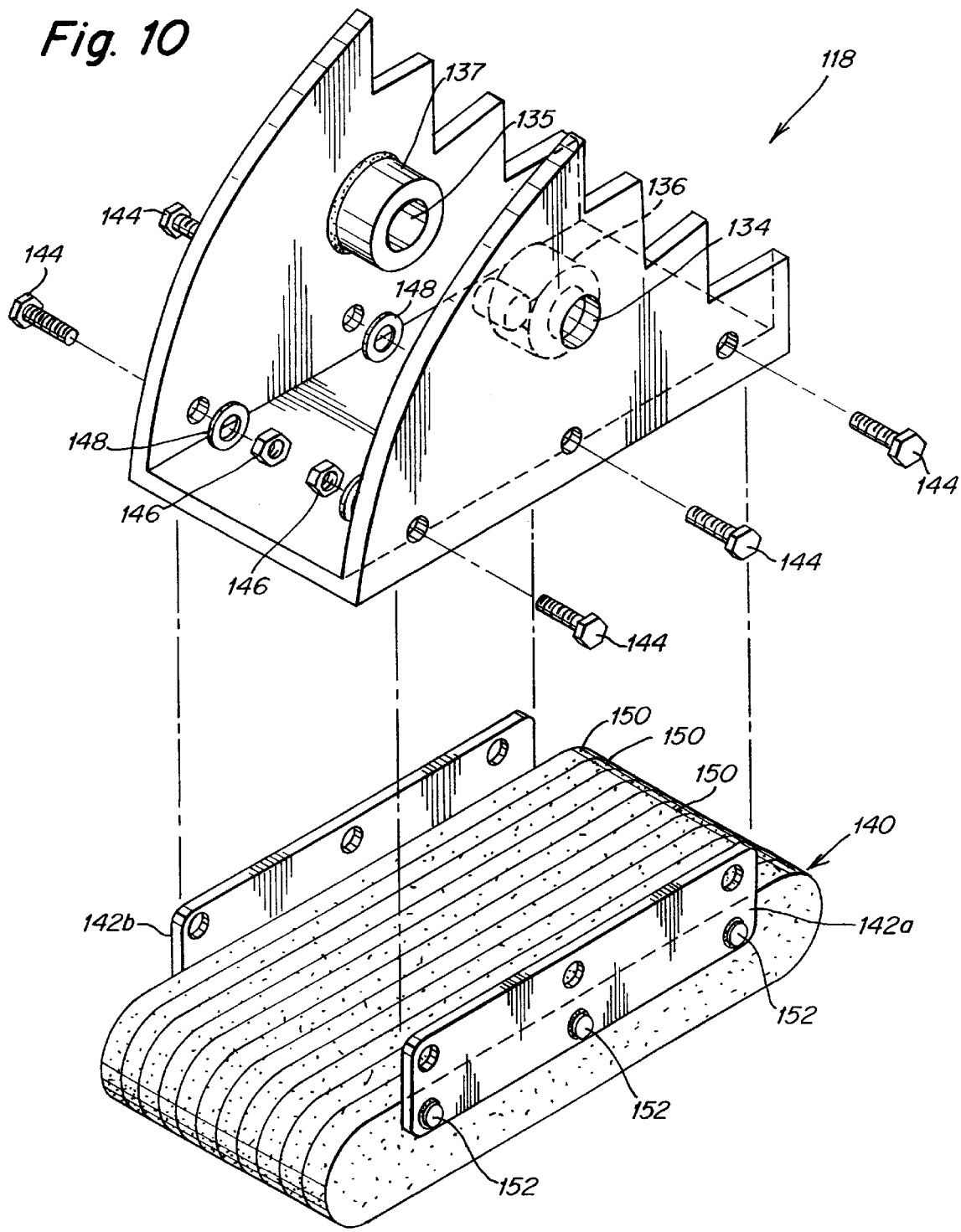
FIG. 10 is an exploded perspective view of the stabilizer pad of FIG. 4 in the position for engaging a smooth surface.

Mounted to the underside of the base plate 122 is a resilient pad 140. The resilient pad 140 is secured to the frame using brackets 142a and 142b which respectfully couple to flanges 124 and 126. The brackets are mounted to the flanges using bolts 144, nuts 146 and washers 148, as best shown in FIG. 10.

The resilient pad 140 is formed using a plurality of rubber strips 150 that are compressed using brackets 142a and 142b and steel rods 152. In the embodiment shown, the steel rods 152 are welded to each of the brackets 142a and 142b, however, in other embodiments, the steel rods can be replaced by bolts and nuts. In one embodiment of the present invention, the rubber strips are made from sidewall segments of truck tire carcasses or from rubber conveyor belts, both of which have been found to provide desirable flexibility and surface friction for use in stabilizer pads.

Each of the flanges 124 and 126 has a hole, respectfully 134 and 135 in alignment with bushings 136 and 137. The holes and bushings are designed to accommodate the pin 34 of the stabilizer arm 14 to couple the stabilizer arm to the stabilizer pad as in the prior art.

The stabilizer pad 118 includes an optional cam 156 mounted to bushing 136. In addition, the stabilizer arm 14 includes a polyethylene wheel 154 mounted to the side of the stabilizer arm as shown in FIG. 4, using a bolt and a nut. In one embodiment, the cam is made from a steel rod and is welded to the bushing, however, in other embodiments, the cam may be made from other relatively hard materials and fastened to the arm using other techniques. The polyethylene wheel and cam prevent inadvertent flipping of the stabilizer pad as described further below and as described in U.S. patent application Ser. No. 08/909,524, which is incorporated herein by reference. Other mechanisms for preventing self-flipping, such as those described in U.S. Pat. Nos. 5,054,812 and 5,667,245, may also be used with stabilizer pads of the present invention.

Figure 6:
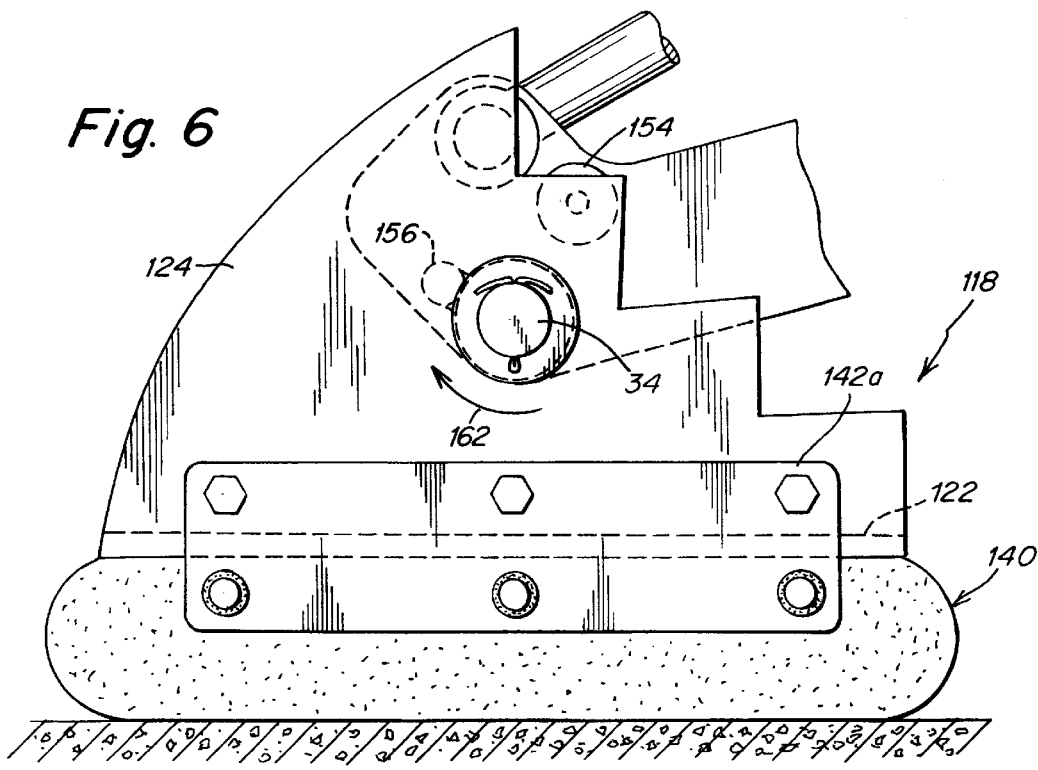
FIG. 6 is a side view of the stabilizer pad of FIG. 4 with the stabilizer pad in the position for engaging a smooth surface.

Stabilizer pad 118 is rotatable about pin 34 when the stabilizer arm is in its upright position to place either the resilient pad 140 or the grouser points 130 downward to engage the ground when the stabilizer arms are lowered to stabilize the vehicle. When the vehicle is operated on a smooth, finished ground surface, it is desirable to place the resilient pad 140 of the stabilizer pad 118 in contact with the ground surface. When the vehicle is operated on a rough or unfinished ground surface, it is desirable to position the stabilizer pad such that the outer grouser points 130, and in some instances the inner grouser points 131, contact the ground surface. FIGS. 4 and 6 show the stabilizer pad with the resilient pad 140 in position to engage the ground surface, while FIGS. 5 and 7 show the stabilizer pad with the outer grouser points 130 in position to engage the ground surface.

Figure 7:
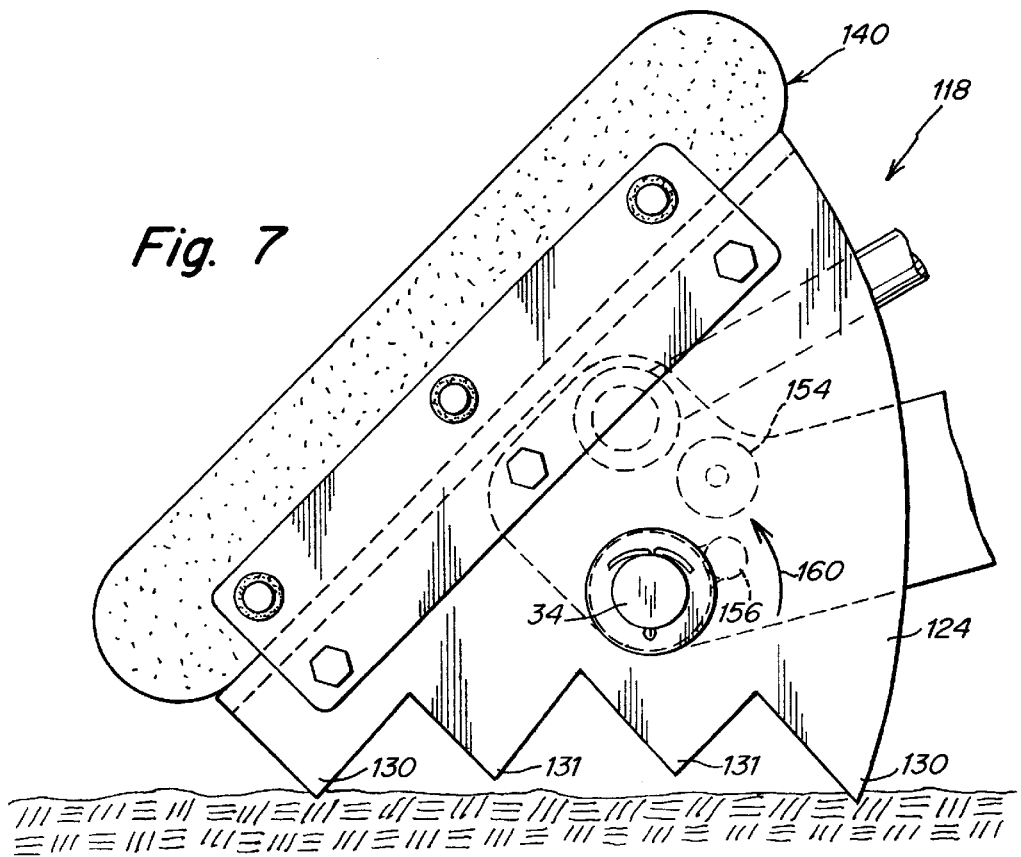
FIG. 7 is a side view of the stabilizer pad of FIG. 4 with the stabilizer pad in the position for engaging a gravel or dirt ground surface.
Figure 8:
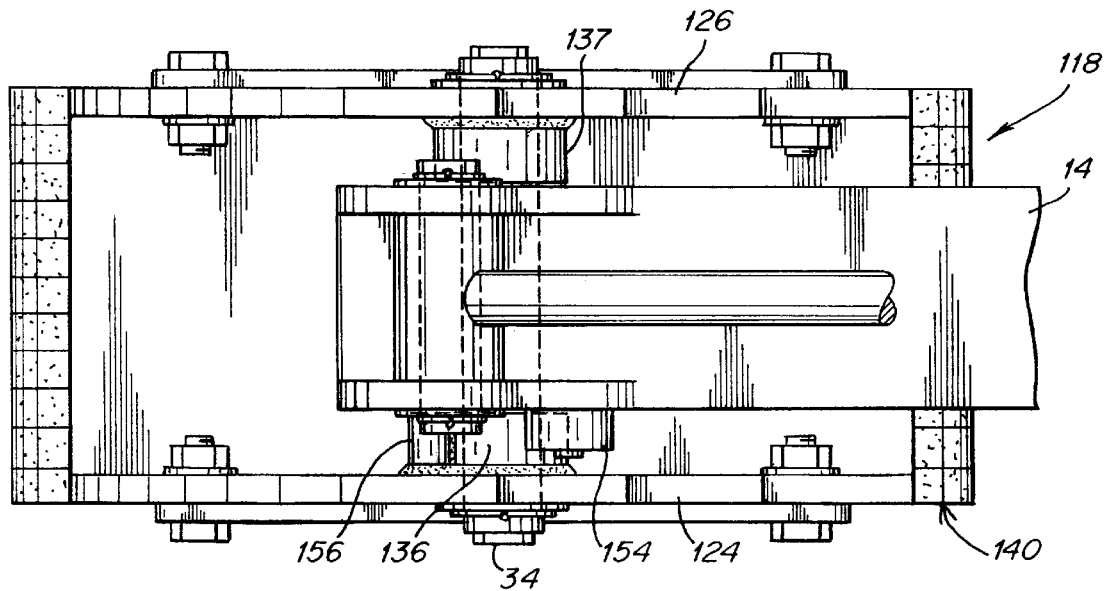
FIG. 8 is a top view of the stabilizer pad of FIG. 4 with the stabilizer pad in the position for engaging a smooth surface.
Figure 9:
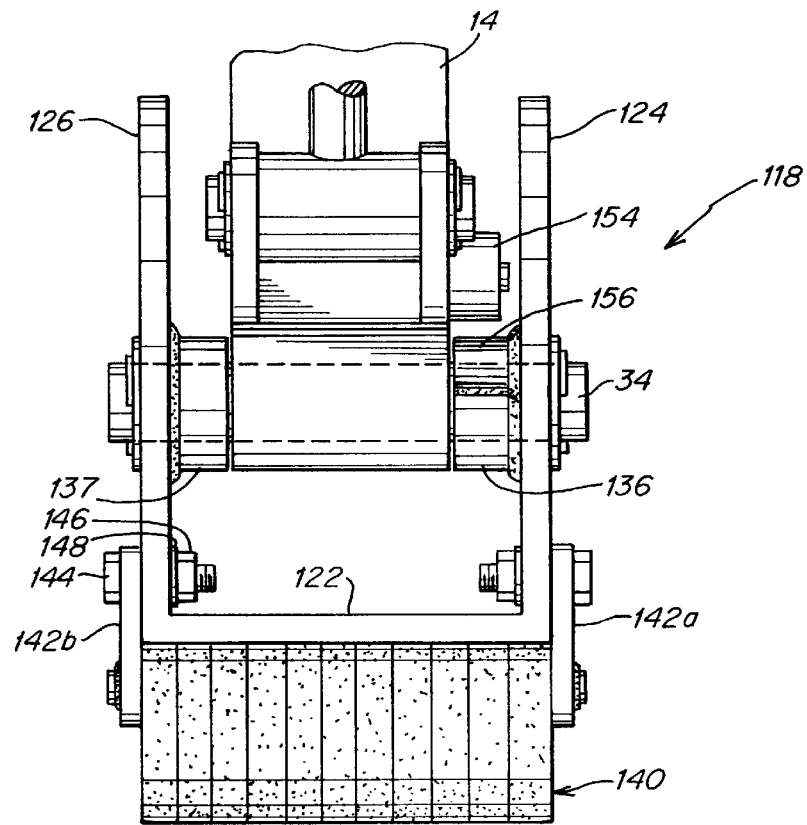
FIG. 9 is a front view of the stabilizer pad of FIG. 4 with the stabilizer pad in the position for engaging a smooth surface.

As shown in FIG. 7, the outer grouser points 130 are slightly longer than the inner grouser points 131 allowing the outer grouser points to contact the ground surface to provide maximum stability. On particularly rough or uneven surfaces, the inner grouser points may also contact the ground surface. In other embodiments of the present invention, the stabilizer pad 118 may not include the inner grouser points.

As briefly discussed above, the polyethylene wheel 154 and cam 156 are used to prevent the stabilizer pad 118 from inadvertently flipping when the stabilizer arm is raised. The weight of the resilient pad 140 may cause the stabilizer pad to flip from the position shown in FIG. 7 to that shown in FIG. 6 by rotating in the direction of arrow 160 when the stabilizer arm is raised. When the stabilizer pad rotates in the direction shown by arrow 160, the cam 156 contacts the wheel 154 and prevents further rotation of the stabilizer pad. When it is desired to flip the stabilizer pad from the position shown in FIG. 7 to that shown in FIG. 6, additional rotational force can be applied to the stabilizer pad by an operator of the vehicle to cause the polyethylene wheel 154 to deform slightly and allow the cam to pass by the polyethylene wheel.

To rotate the stabilizer pad from the position shown in FIG. 6 to that shown in FIG. 7, the stabilizer pad is rotated approximately 135° about the pin 34 in the direction shown by arrow 162 (see FIG. 6). Similarly, to move from the position shown in FIG. 7 to that shown in FIG. 6, the stabilizer pad 118 is rotated approximately 135° about pin 34 in the direction shown by arrow 160.

Figure 11:
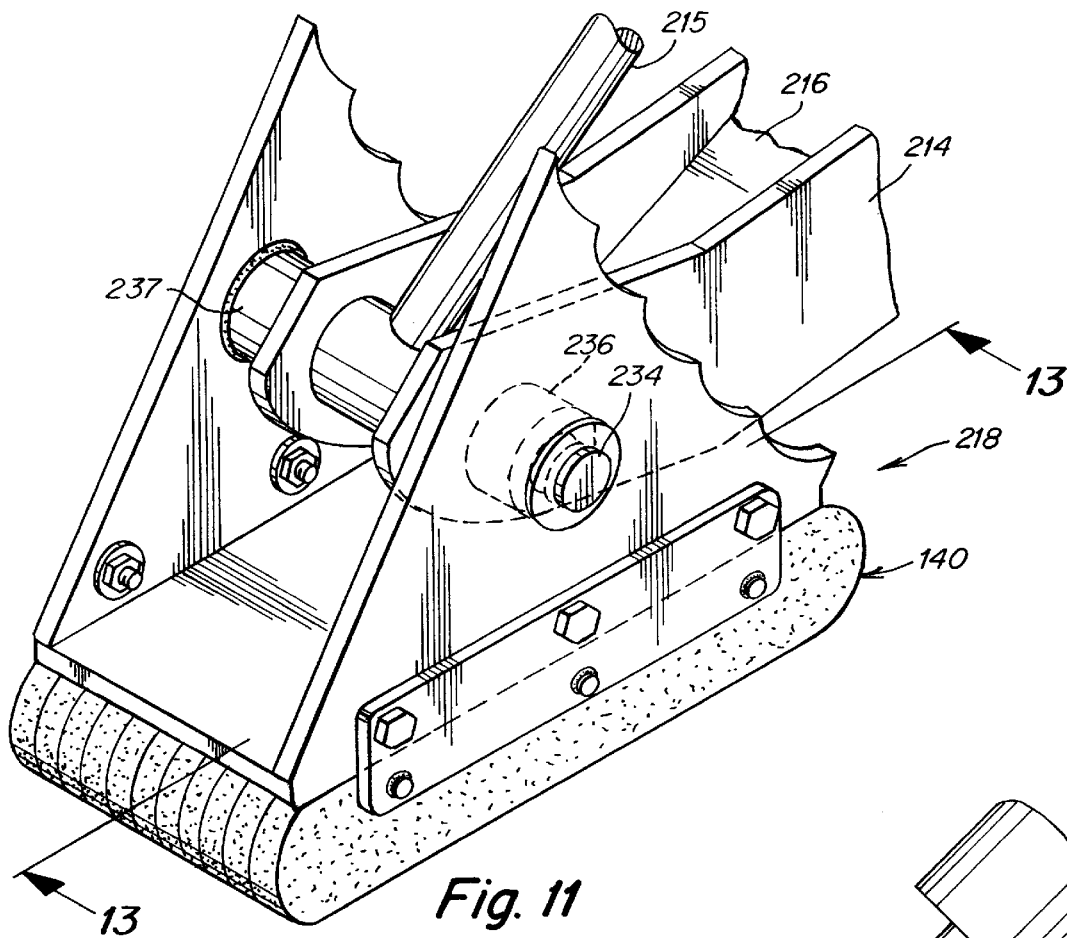
FIG. 11 is a perspective view of a second embodiment of a stabilizer pad with the stabilizer pad in the position for engaging a smooth surface.
Figure 12:
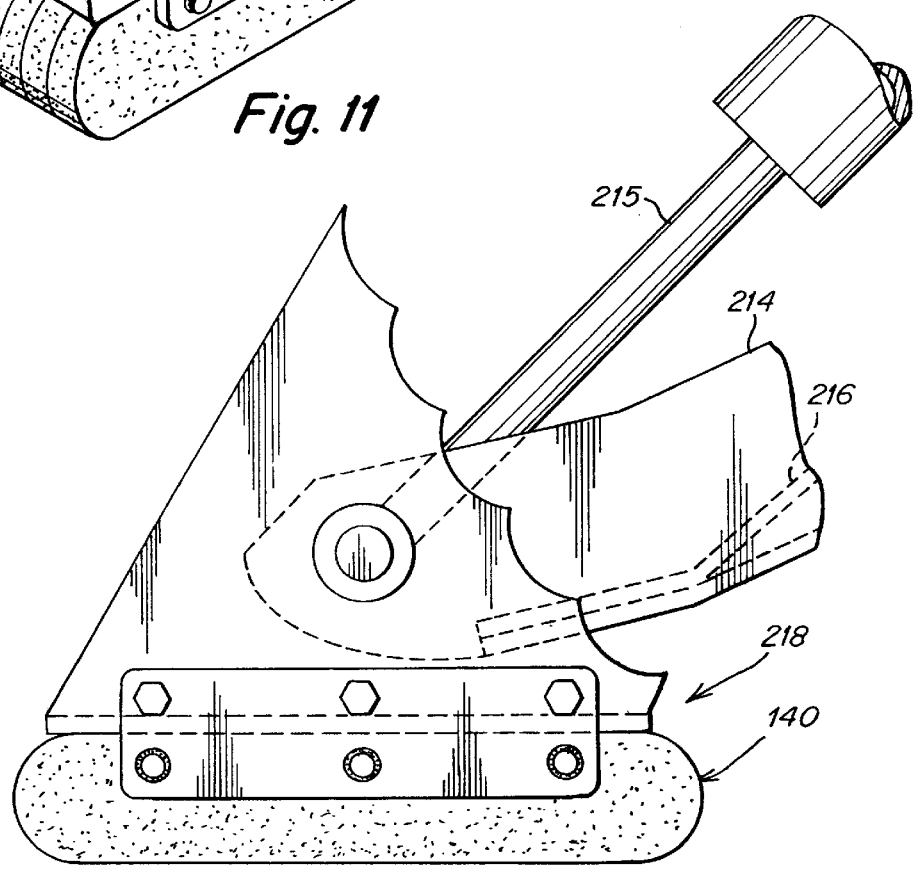
FIG. 12 is a side view of the stabilizer pad of FIG. 11.
Figure 13:
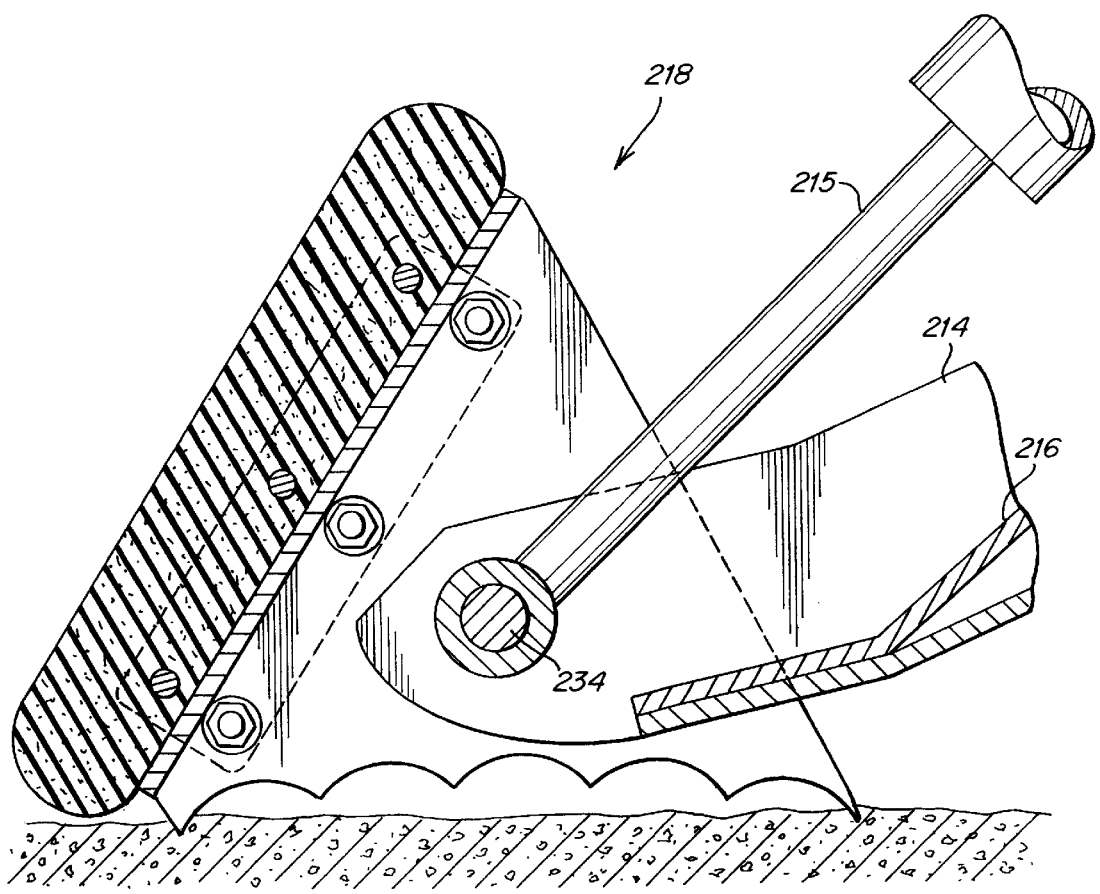
FIG. 13 is a cross-sectional side view taken along line 13—13 of FIG. 11 with the stabilizer pad in the position for engaging a dirt or gravel surface.

A second embodiment of a stabilizer pad 218 in accordance with the present invention will now be described with reference to FIGS. 11–13, which show the stabilizer pad 218 mounted to a stabilizer arm 214. Stabilizer arm 214 differs from stabilizer arm 14 in that it includes only one pin 234 for coupling to both a hydraulic piston 215 and to the stabilizer pad 214. In addition, the stabilizer arm 214 includes a steel plate 216 contained within the stabilizer arm to provide rigidity to the stabilizer arm. Stabilizer pad 218 is similar to stabilizer pad 118, and similar components are labeled using the same reference numbers. Stabilizer pad 218 differs from stabilizer pad 18 in that the bushings 236 and 237 used to mount the stabilizer pad 218 to the stabilizer arm 214 are sized to accommodate the pin 234.

A third embodiment of a stabilizer pad 318 for use on the stabilizer arm 14 will now be described with reference to FIGS. 14–16. The third embodiment includes flange pieces 324 and 326 and a resilient pad 340. The flanges 324 and 326 are coupled together through the pin 34 of the stabilizer arm and are coupled to the resilient pad 340. The flange pieces have bushings 336 and 337 for receiving the pin 34. Each of the flange pieces has a pair of outer grouser points 330 and three inner grouser points 331. Each of the flange pieces also includes a pair of right angle re-enforcing sections 332 and 334, which provide structural re-enforcement for the pad and as described below provide additional stabilization when the stabilizer pad is used on a rough or unfinished surface. The right angle sections 332 also function as mounting brackets for mounting the reversible resilient pad 340, and each of the right angle sections 332 includes mounting holes 345 for this purpose.

The resilient pad 340, similar to the pad 140 of the first embodiment, is formed from a plurality of rubber strips 350. The rubber strips 350 are compressed between brackets 342a and 342b using steel rods 352. Each of the rubber strips 350 and the brackets 342a and 342b has a slot 362 to receive a mounting plate 322. The mounting plate 322 has mounting holes 360 that align with mounting holes 345 on the flanges to mount the mounting plate to the flanges using bolts 349, washers 346 and nuts 348. In one version of the third embodiment, the flanges 324 and 326 and the mounting plate 322 are made from steel.

Figure 14:
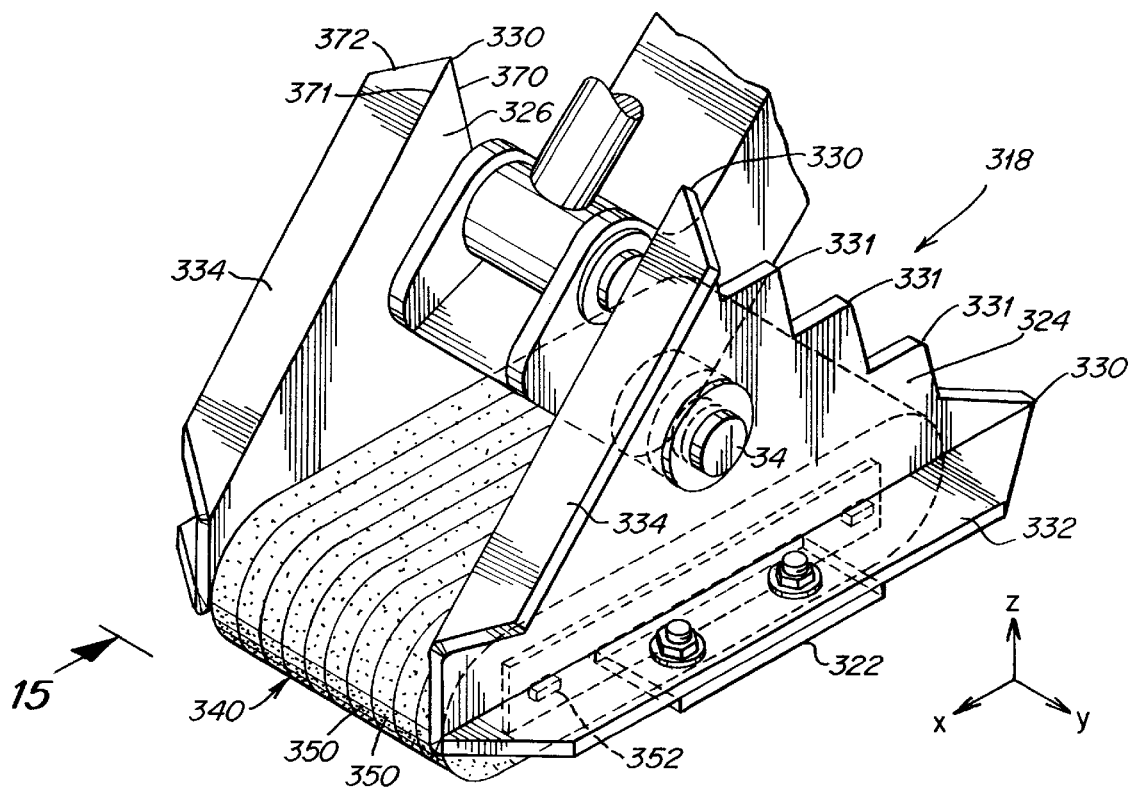
FIG. 14 is a perspective view of a third embodiment of a stabilizer pad with the stabilizer pad in the position for engaging a smooth surface.
Figure 15:
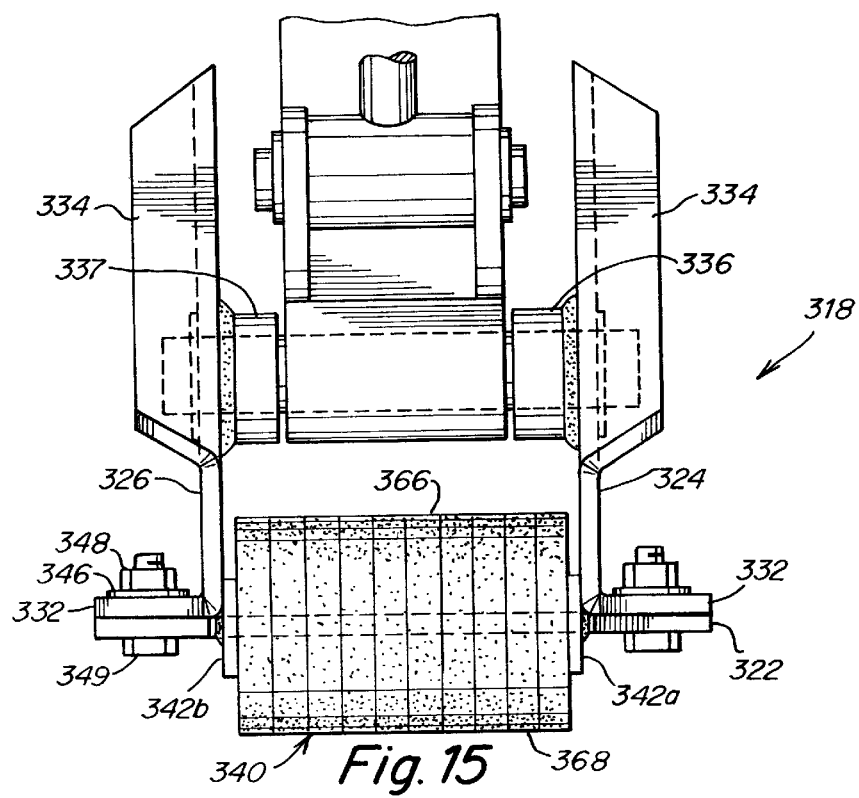
FIG. 15 is a front view of the stabilizer pad of FIG. 14 as taken along line 15—15 of FIG. 14.
Figure 16:
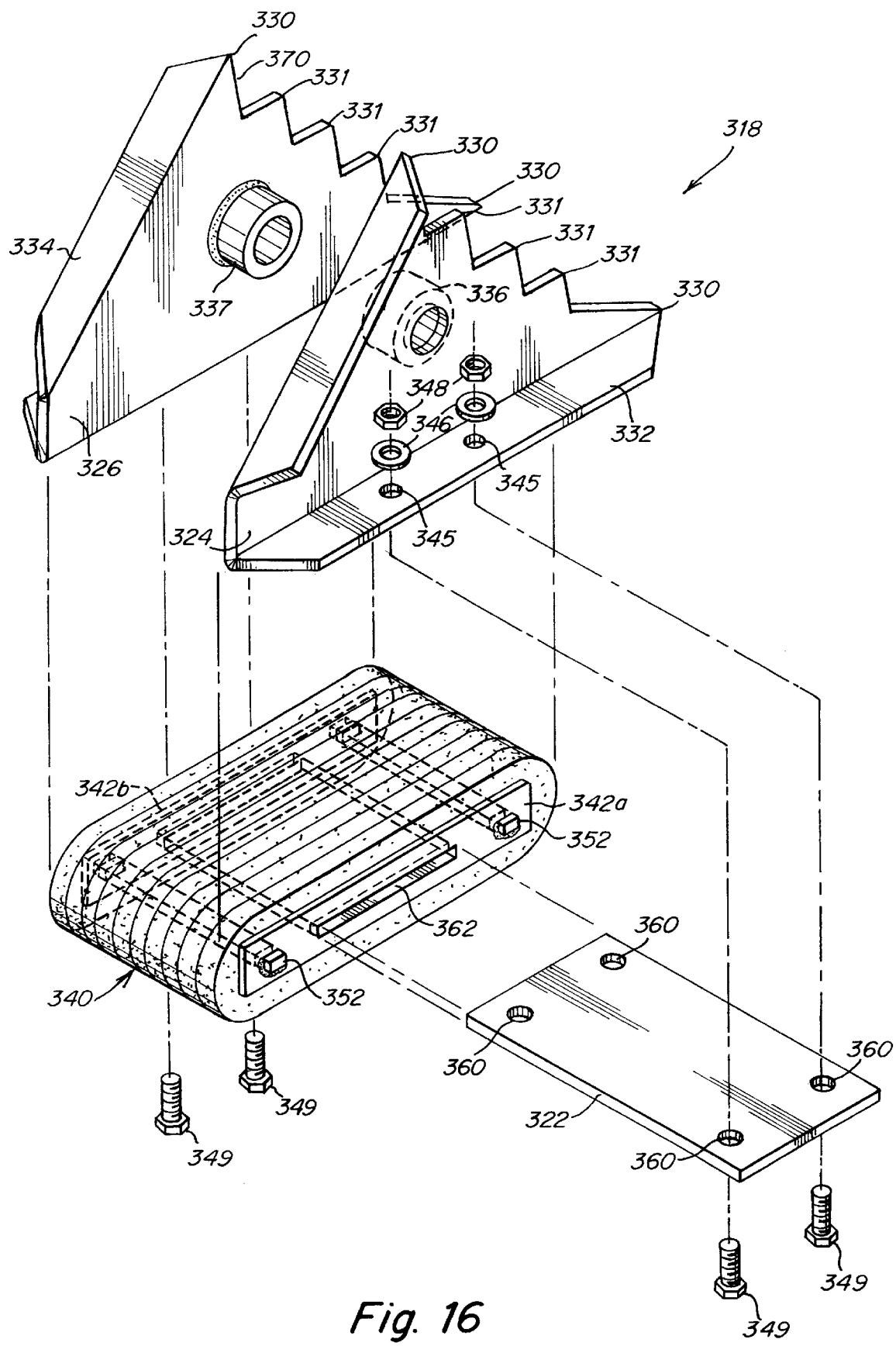
FIG. 16 is an exploded perspective view of the stabilizer pad of FIG. 14.

One significant advantage of the embodiment of the invention shown in FIGS. 14–16 is that the resilient pad 340 is reversible to extend the life of the pad. The resilient pad 340 can be mounted such that either surface 368 contacts the ground (as shown in FIG. 15), or such that surface 366 of the pad contacts the ground. With the resilient pad 340 removed from the flanges, the resilient pad can be rotated 180 degrees to change from surface 368 of the pad facing down to surface 366 of the pad facing down. The rubber strips used with stabilizer pads can wear overtime, and the ability to change surfaces of the resilient pad 340 significantly extends the usable life of the resilient pad.

Stabilizer pad 318 is rotatable about pin 34 in a manner similar to stabilizer pad 118 described above to allow either the resilient pad 340 or the grouser points to contact the ground. As with stabilizer pad 118, the outer grouser points 330 are longer than the inner grouser points 331.

In FIGS. 14 and 15, stabilizer pad 318 is shown mounted to the stabilizer arm 14 using pin 34. In other embodiments, the stabilizer pad 318 may be mounted to stabilizer arm 214 using a common pin, such as pin 234 in FIG. 11, with the hydraulic piston 215.

Figure 3:
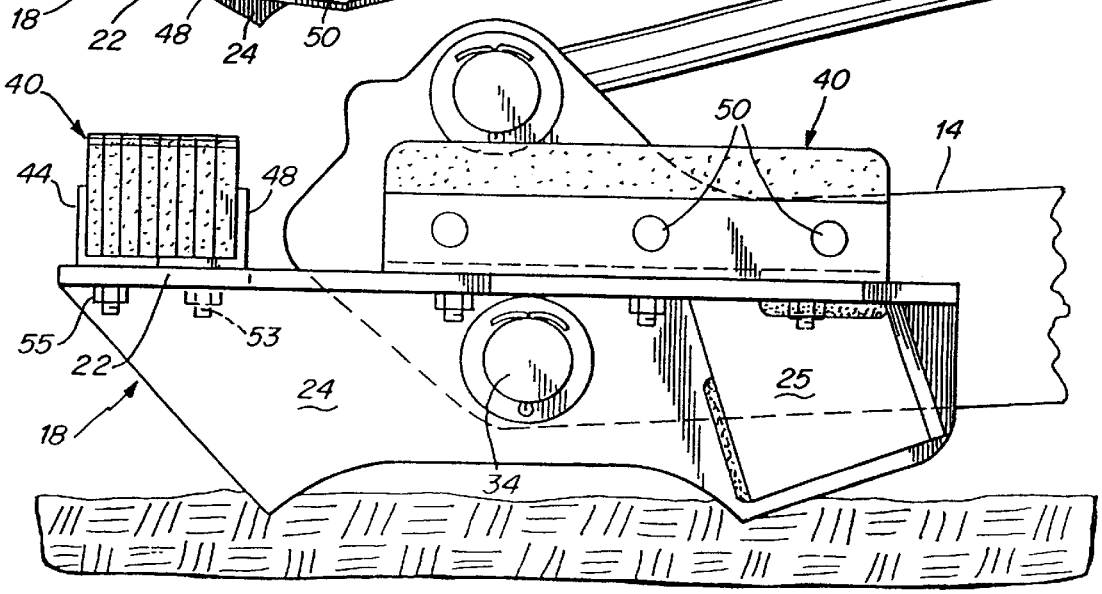
FIG. 3 is a side elevational view of the stabilizer pad and arm construction in the position of FIG. 2.

The right angle sections 332 and 334 provide additional stability for the stabilizer pad 318 when the grouser points 330 contact the ground. Typical grouser points, such as those provided on flanges 24 and 26 of prior art stabilizer pad 18 (FIG. 3), have angled surfaces extending in opposite directions along one axis from the tip of the grouser point. Grouser points 330 have angled surfaces 370 and 371 extending from the tip of the grouser points in opposite directions along an x axis (see FIG. 14 for axis orientation), and in addition have angled surfaces 372 extending in a direction along a y-axis orthogonal to the x-axis. The rights angle sections provide additional stability by resisting movement of the stabilizer pad in the y-axis direction. As understood by one skilled in the art, in other embodiments, the right angle sections 332 and 334 may form an angle other than ninety degrees with the flanges.

A fourth embodiment of a stabilizer pad 418 in accordance with the present invention will now be described with reference to FIGS. 17 and 18. Stabilizer pad 418 is similar to stabilizer pad 318 and like parts are labeled using the same reference numbers. Stabilizer pad 418 differs from stabilizer pad 318 in that the resilient pad 440 of stabilizer pad 418 has two separate slots 462a and 462b rather than one slot 362 as in resilient pad 340 of stabilizer pad 418. In addition, the mounting plate 322 of stabilizer pad 318 is replaced by two separate mounting plates 422a and 422b in stabilizer pad 418. In the fourth embodiment, two mounting plates are used to mount the resilient pad to the flanges, in other embodiments, more than two mounting plates may be used. In the third and fourth embodiments, the mounting plate or mounting plates act as the base plate for the stabilizer pads.

Figure 19:
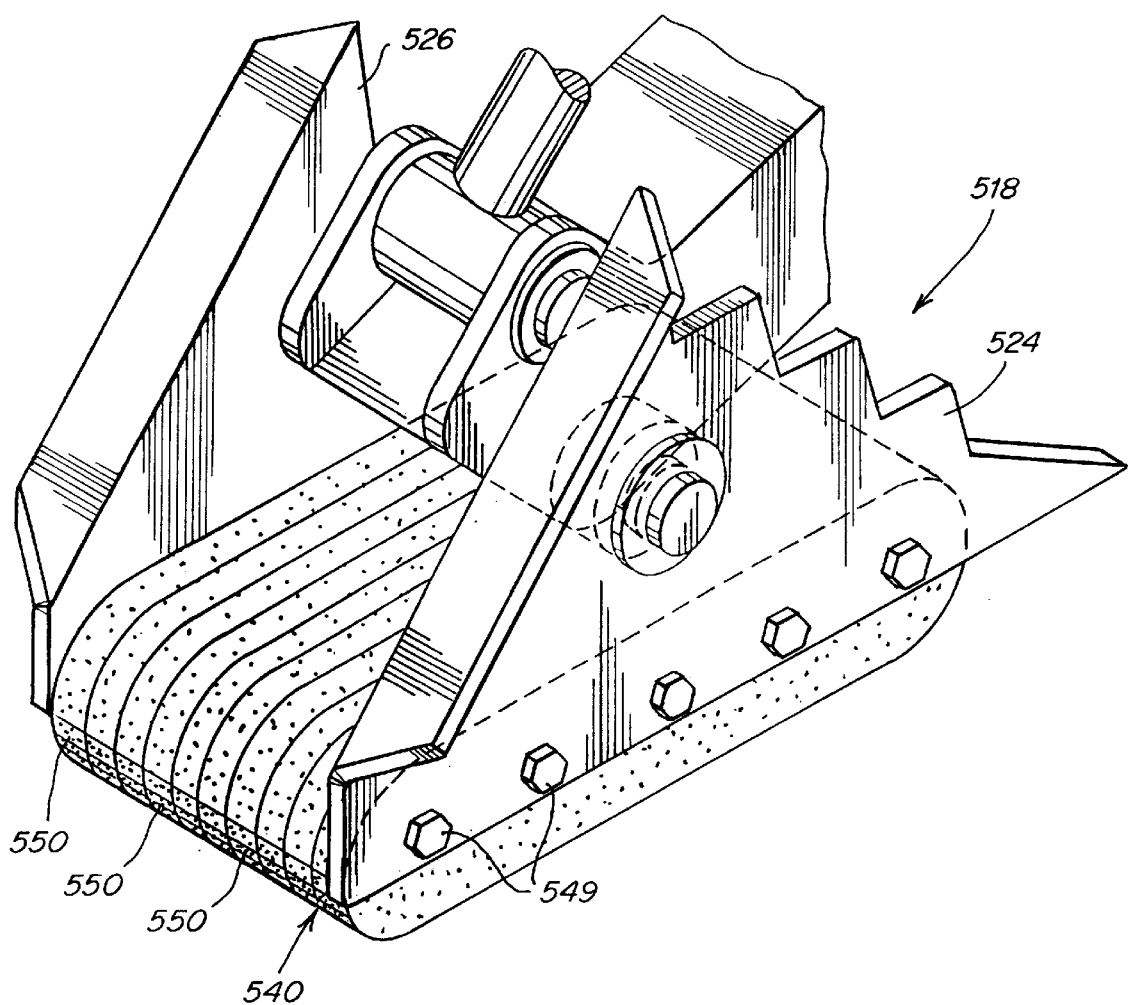
FIG. 19 is a perspective view of a fifth embodiment of a stabilizer pad with the stabilizer pad in the position for engaging a smooth surface.

A fifth embodiment of a stabilizer pad 518 in accordance with the present invention will now be described with reference to FIGS. 19 and 20. Stabilizer pad 518 is similar to stabilizer pad 318 and like parts are labeled using the same reference numbers. The primary difference between stabilizer pad 518 and stabilizer pad 318 is that a mounting plate is not used to mount the resilient pad to the flanges. Rather, bolts are used to compress the rubber strips of the resilient pad between the flanges of the stabilizer pad 518 as described below. In this embodiment, the resilient pad acts as the base plate of the stabilizer pad.

Stabilizer pad 518 includes flanges 524 and 526 and resilient pad 540. Flanges 524 and 526 are similar to flanges 324 and 326 of stabilizer pad 318, except that flanges 524 and 526 do not include right angle brackets 332, and flanges 524 and 526 include mounting holes 540 for mounting the resilient pad to the flanges using bolts 549, washers 546 and nuts 548.

Resilient pad 540 includes rubber strips 550, each of which has holes 562 for receiving the bolts 549. Resilient pad 540 differs from resilient pad 340 in that pad 540 does not include metal brackets for compressing the rubber strips 550. In stabilizer pad 518, the rubber strips 550 are compressed together between the flanges 524 and 526 using the bolts 549 and the nuts 548. In the embodiment shown in FIGS. 19 and 20, the holes 562 for the bolts 549 in the resilient pad 540 are centered between a first planar surface 566 and a second planar surface 568 of the pad 540. This allows the resilient pad to be reversible so that either the first planar surface or the second planar surface is positioned to contact the ground.

A sixth embodiment of a stabilizer pad 618 will now be further described with reference to FIGS. 21 and 22. Stabilizer pad 618 is similar to stabilizer pad 118 described above in that both have a substantially U-shaped frame made from a continuous steel sheet. Stabilizer pad 618 differs from stabilizer pad 118 in that the degree of rotation from one working side of the stabilizer pad to the other working side is 180 degrees for stabilizer pad 618 verses 135 degrees for stabilizer pad 118.

The U-shaped frame of stabilizer pad 618 includes a base plate 622, flanges 624 and 626 and a resilient pad 640. Each of the flanges has grouser points 630. The resilient pad is mounted to mounting holes 639 of the base plate 622 using bolts 649, washers 646 and nuts 648. The resilient pad 640, like resilient pad 140, is formed using a plurality of rubber strips 650 that are compressed using brackets 642a and 642b and steel rods 652. In the embodiment shown, the steel rods 652 are welded to each of the brackets 642a and 642b. Each of the brackets 642a and 642b have right angle sections 643 having holes 644 for mounting the resilient pad 640 to the base plate 622.

A seventh embodiment of a stabilizer pad 718 in accordance with the present invention will now be described with reference to FIG. 23. Stabilizer pad 718 is substantially identical to stabilizer pad 618 except that the U-shaped frame of stabilizer pad 618 is replaced by two flange sections 724 and 726. Each of the flange sections has grouser points 730 and a right angle bracket 722 having mounting holes 739 for mounting the resilient pad to the flange sections.

In stabilizer pads 618 and 718, all of the grouser points 630 and 730 are shown as being of approximately the same height. In other versions, the outermost grouser points on each of the flanges may be longer than the inner grouser points to provide four-point contact of the stabilizer pads at substantially the outermost points on the stabilizer pads to maximize stability.

Figure 17:
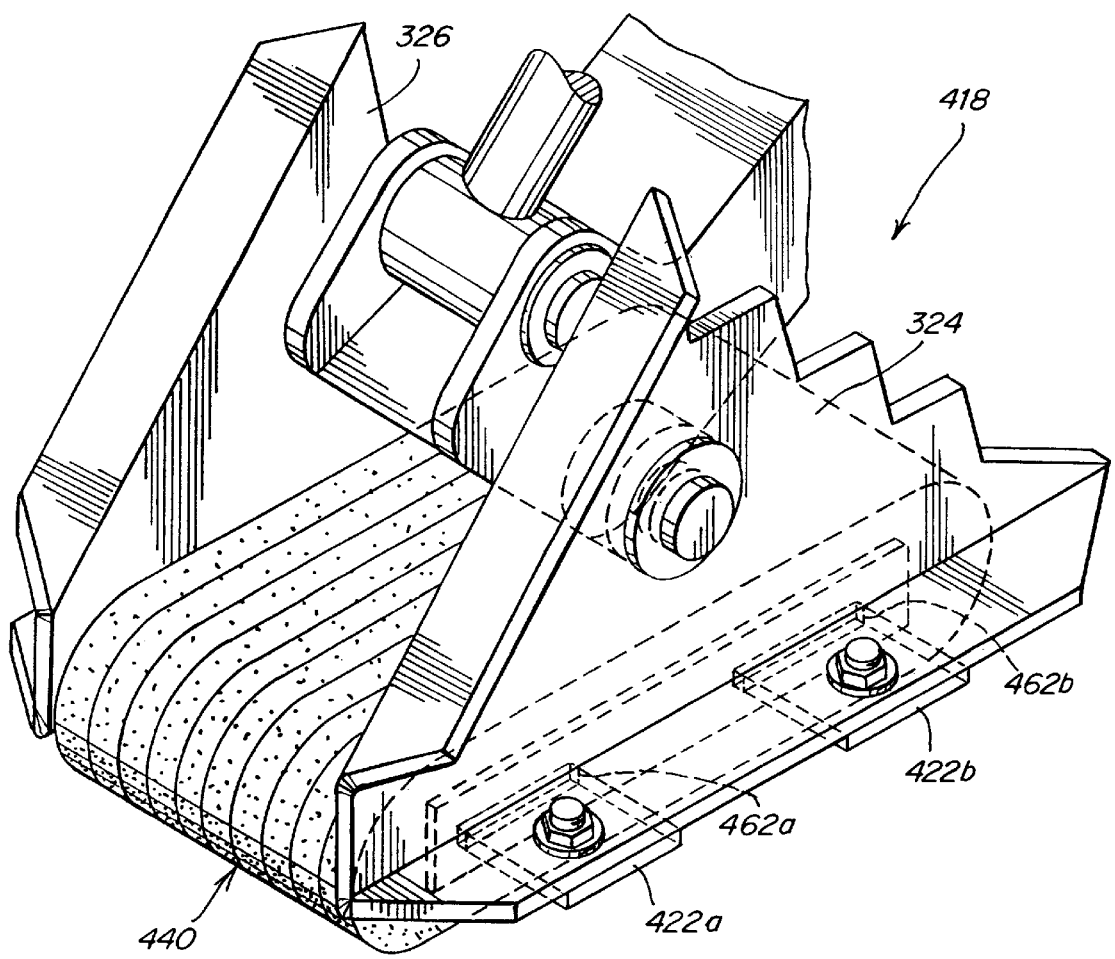
FIG. 17 is a perspective view of a fourth embodiment of a stabilizer pad with the stabilizer pad in the position for engaging a smooth surface.
Figure 18:
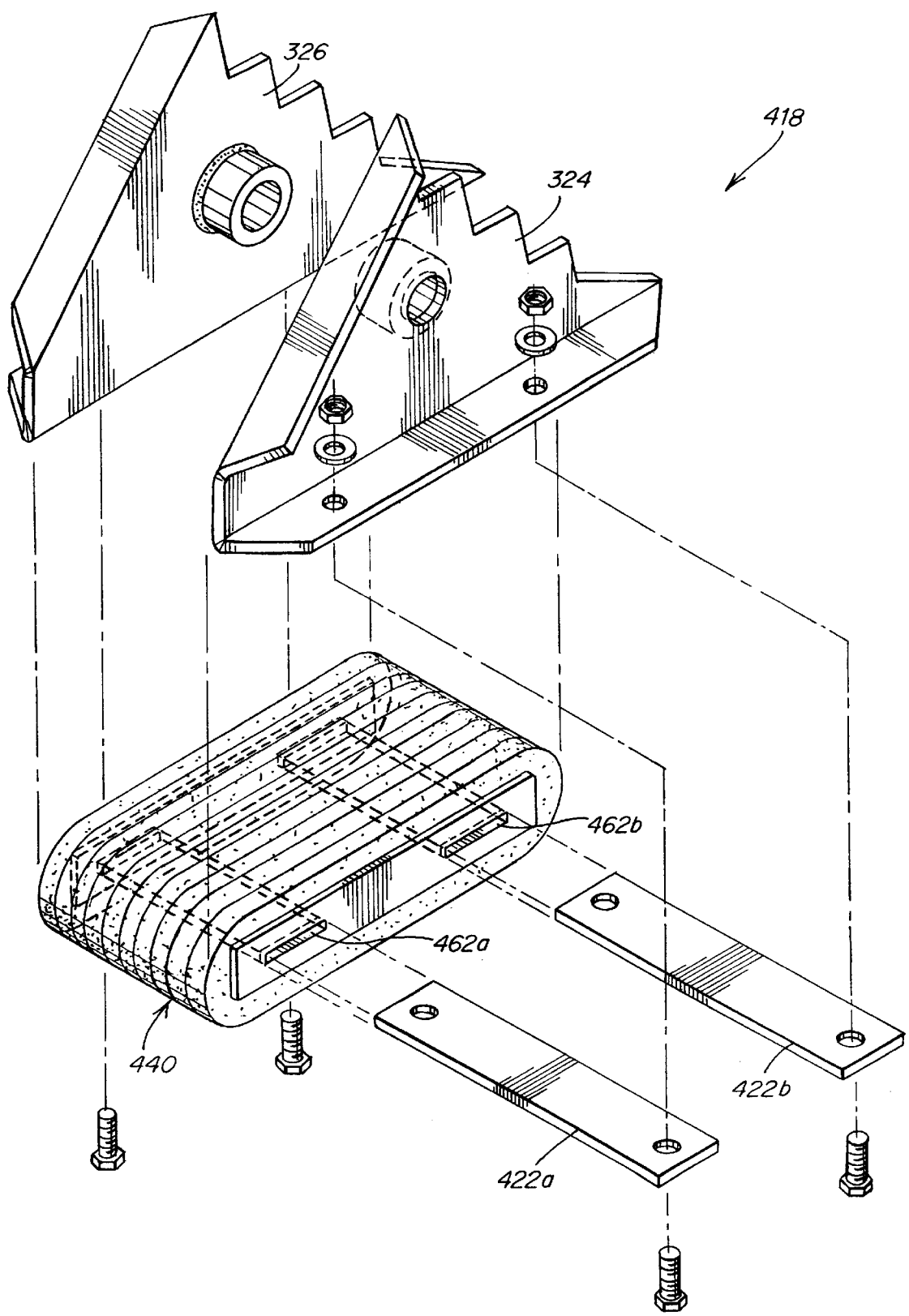
FIG. 18 is an exploded perspective view of the stabilizer pad shown in FIG. 17.
Figure 20:
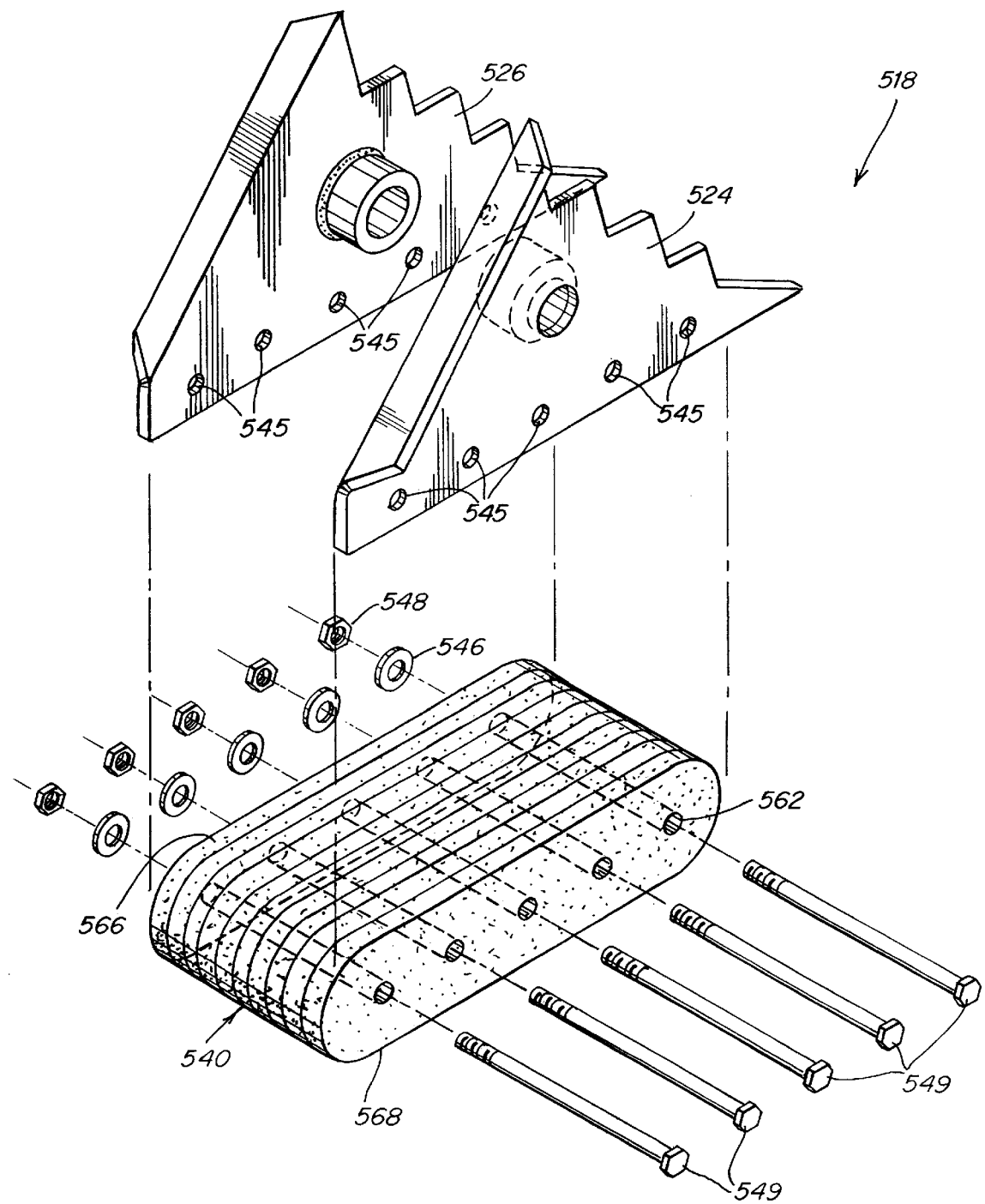
FIG. 20 is an exploded perspective view of the stabilizer pad of FIG. 19.
Figure 21:
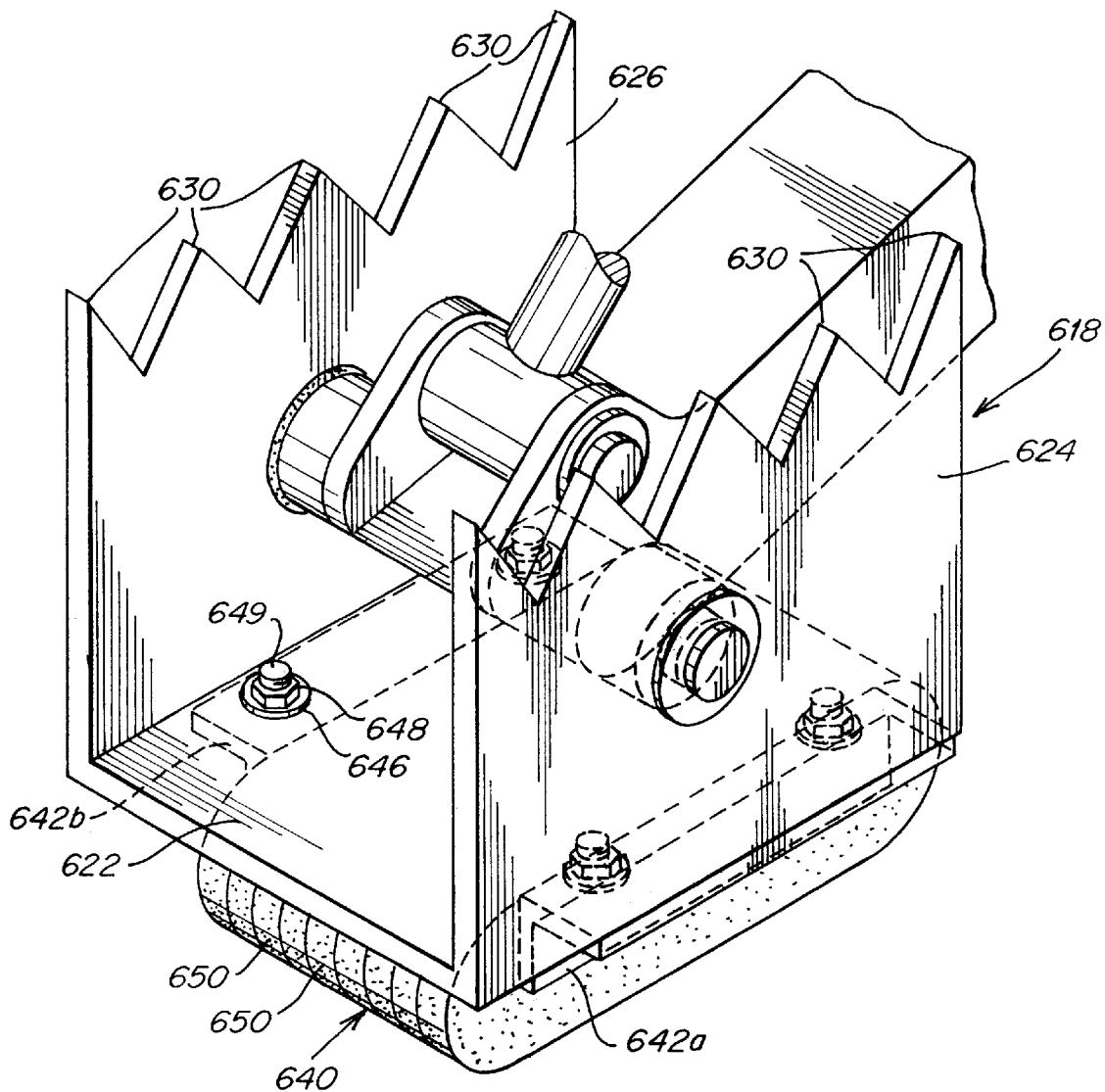
FIG. 21 is a perspective view of a sixth embodiment of a stabilizer pad with the stabilizer pad in the position for engaging a smooth surface.
Figure 22:
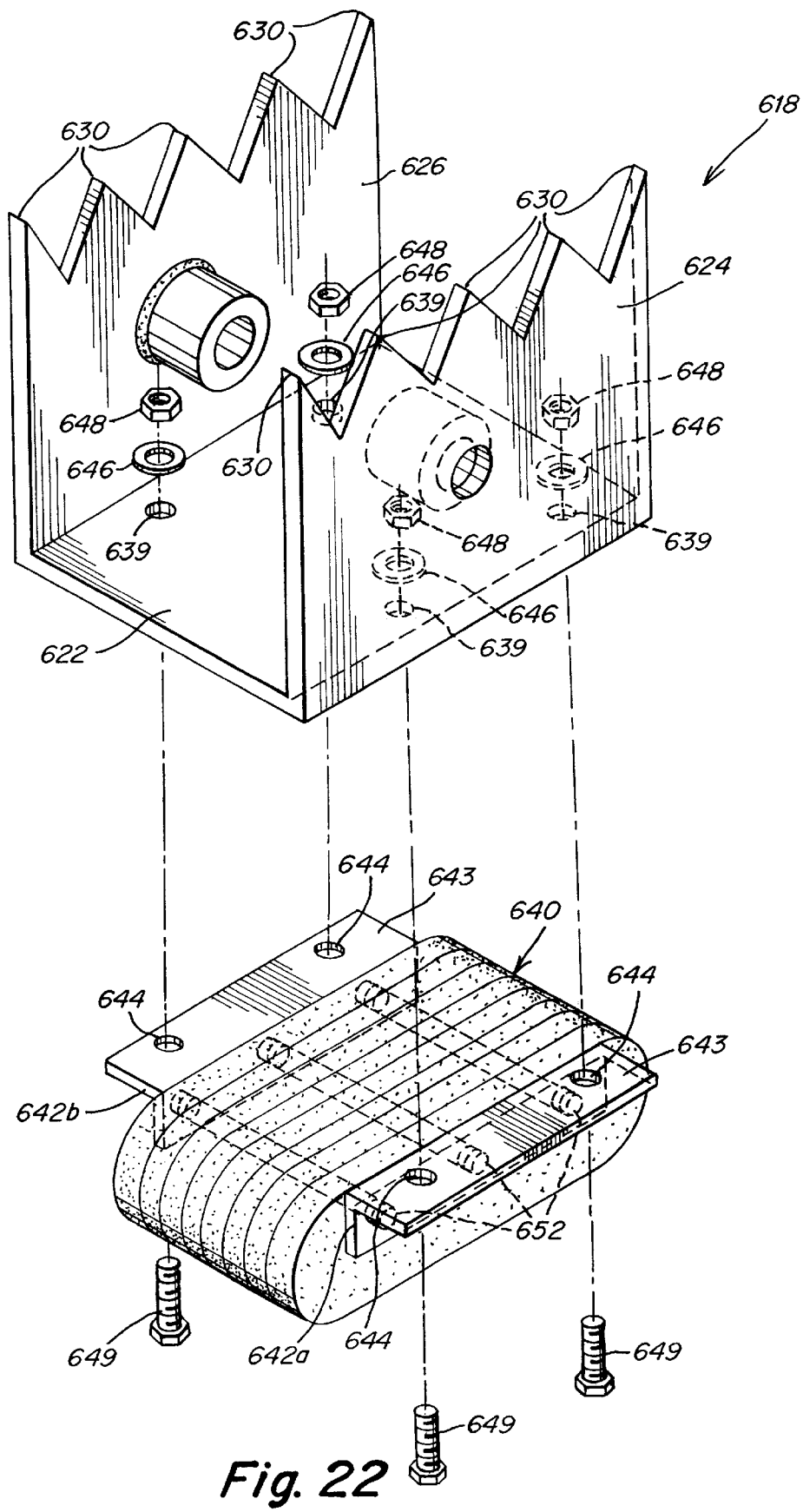
FIG. 22 is an exploded perspective view of the stabilizer pad of FIG. 21.
Figure 23:
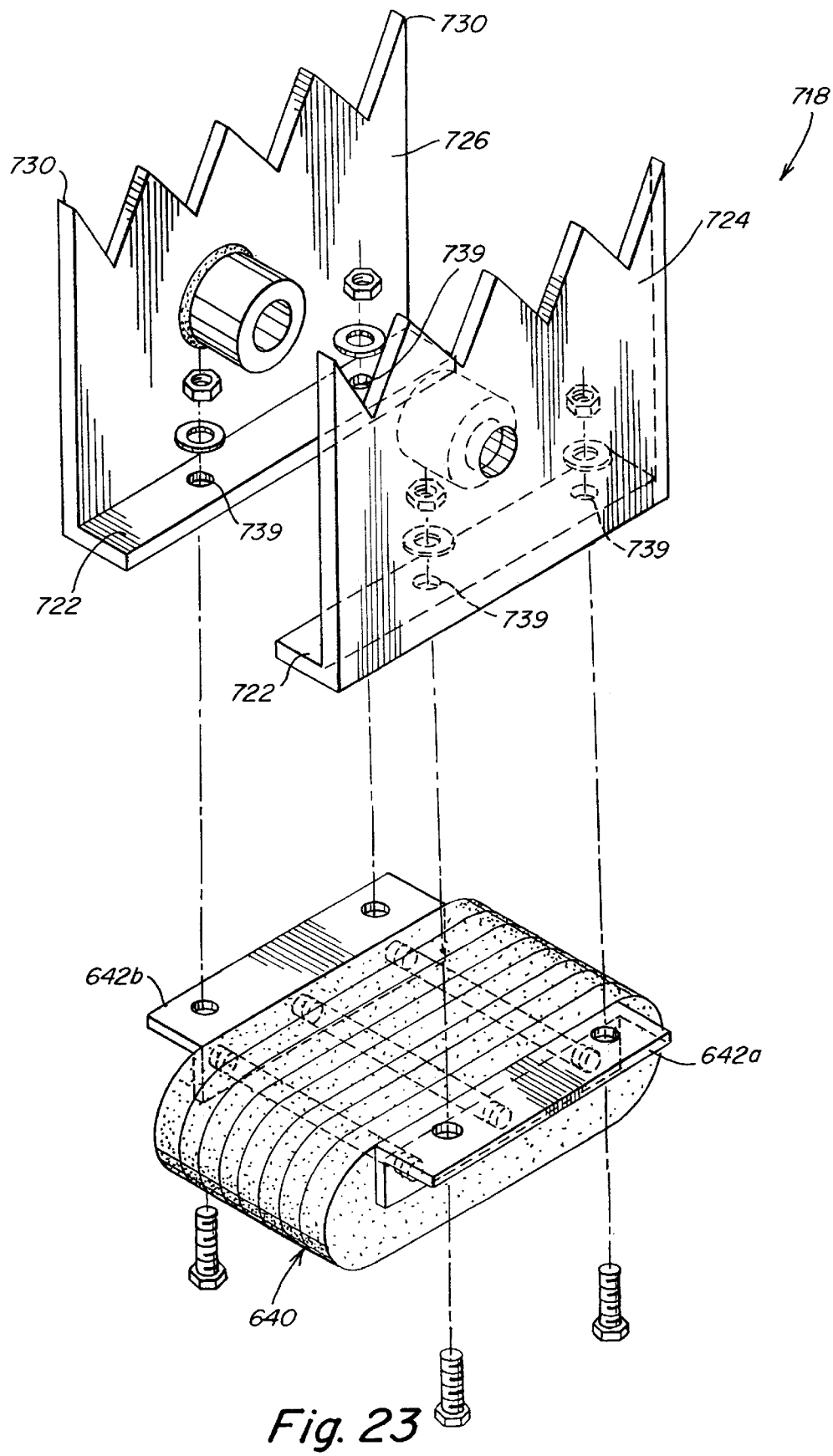
FIG. 23 is an exploded perspective view of a sixth embodiment of a stabilizer pad with the stabilizer pad in the position for engaging a smooth surface.

In other versions of the embodiment shown in FIGS. 21–23, the flanges and brackets can be modified to accommodate the resilient pad 140 shown in FIG. 4, or one of the reversible resilient pads shown in FIGS. 14, 17 and 20.

The embodiments of the invention shown in FIGS. 11–23 do not include the cam 156 and the wheel 158 described above with respect to the stabilizer pad 118. As understood by one skilled in the art, to prevent self-flipping of the stabilizer pads shown in FIGS. 11–23, the cam 156 could be included on the stabilizer pads and the wheel 158 could be included on the arm.

Some embodiments of the present invention described above have reversible rubber pads. The reversible pads could be replaced with single-sided pads as understood by those skilled in the art.

Figure 2:
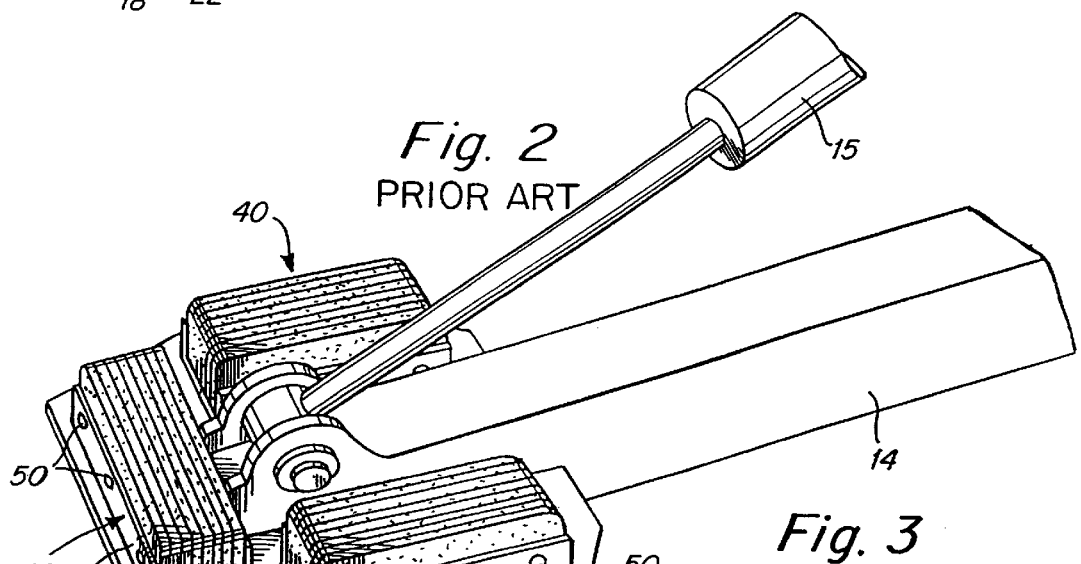
FIG. 2 is a perspective view of the stabilizer pad and arm of FIG. 1 in a gravel or dirt engaging position.

One advantage of embodiments of stabilizer pads of the present invention over prior art stabilizer pads is a reduction in manufacturing costs. In the first embodiment of the present invention, described above with reference to FIGS. 4–10, the U-shaped frame can be formed from one piece of steel without requiring any welding. Alternatively, the U-shaped frame could be manufactured as a single cast piece. A further reduction in manufacturing costs is provided by the use of a single laminated pad in place of the three laminated pads used in the prior art stabilizer pad shown in FIGS. 1–3. In addition to reducing manufacturing costs, stabilizer pads of the present invention are inherently structurally stronger than prior art pads and are therefore less susceptible to wear and have an extended operational life, even in adverse operating environments. Also, the use of a reversible laminated pad significantly increases the life of stabilizer pads of the present invention.

In the prior art, one side of the resilient pad used with stabilizer pads is typically coupled to a rigid mounting member for mounting the resilient pad to the stabilizer pad. The resilient pads used in embodiments of the present invention are mounted to the stabilizer pad at a central point in the pad to allow the pad to have two or more working surfaces to significantly extend the life of the pad. In illustrative embodiments described above, resilient pads have two working surfaces. However, the present invention is not limited to pads having two working surfaces, but includes pads with more than two working surfaces.

In embodiments of the present invention described above, stabilizer pads include flanges having grouser points for engaging a rough or gravel ground surface. As understood by those skilled in the art, grouser points used with embodiments of the present invention are not limited to tapered steel points formed in the flanges, but also include other gripping devices arranged on the stabilizer pad to enable the stabilizer pad to grip a rough or gravel surface to prevent the stabilizer pad from slipping.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A stabilizer pad assembly for use with a stabilizer arm, the stabilizer pad assembly comprising:

a pair of laterally spaced apart plate members, each plate member having opposed substantially flat surfaces and multiple edge portions, the pair of plate members being pivotally attached to the stabilizer arm by a pin extending laterally between facing substantially flat surfaces of respective plate members;

a resilient pad formed with upper and lower substantially planar surfaces, and with at least one passage extending transversely therethrough between opposite sides of said resilient pad; and at least one mounting member extending through the at least one passage in said resilient pad, the mounting member having outer end portions projecting laterally beyond the opposite sides of the resilient pad, the pad being positionable with opposite sides thereof disposed between the pair of plate members, and fasteners for removably connecting the end portions to edge portions of the respective plate members, the pad being selectively reversible relative to the pair of plate members for permitting selective positioning of either the upper surface or the lower surface of the pad for use as a working surface for ground engagement.

2. The stabilizer pad of claim 1, wherein the resilient pad includes a plurality of rubber strips.

3. The stabilizer pad of claim 1, wherein each of the plate members has a pair of grouser points to engage a ground surface, and wherein for each pair of grouser points, a first grouser point of the pair extends a greater distance from the base plate than a second grouser point of the pair.

4. The stabilizer pad of claim 1, further comprising means for preventing inadvertent rotation of the stabilizer pad about the pin.

5. The stabilizer pad of claim 1, wherein each of the first and second plate members includes a mounting hole to receive the pin.

6. The stabilizer pad of clam 5, further comprising:

a first bushing mounted to the first plate member at the mounting hole to receive the pin;

a second bushing mounted to the second plate member at the mounting hole to receive the pin;

a cam mounted to one of the first and second bushings and constructed and arranged to contact a part of the arm upon rotation of the stabilizer pad with respect to the pin.

7. The stabilizer pad of claim 1, wherein said resilient pad passage comprises a substantially rectangular cross-section slot for receiving said mounting member in the form of a substantially rectangular cross-section flat plate.

8. The stabilizer pad of claim 1, wherein said resilient pad upper and lower surfaces extend substantially parallel to each other and said passage extends through said resilient pad in a direction substantially parallel to said upper and lower surfaces.

9. The stabilizer pad of claim 1, wherein said mounting member comprises a flat mounting bracket.

10. The stabilizer pad of claim 1, wherein said mounting member comprises a pair of spaced mounting brackets.

11. The stabilizer pad of claim 1, wherein said mounting member comprises a plurality of bolts extending through a like plurality of slots in said resilient pad.

12. The stabilizer pad of claim 1, including a pair of brackets associated respectively with said pair of plate members, each said bracket supporting an end portion.

13. The stabilizer pad of claim 12, wherein said mounting member includes a rigid rod, and said pad passage is dimensioned to receive said rod.

14. The stabilizer pad of claim 13, wherein said fasteners include welds at the ends of the rod to secure the rod to the bracket.

15. The stabilizer pad of claim 14 including a plurality of rods and related plurality of passages in the pad for receiving respective rods.

16. The stabilizer pad of claim 1, including a base plate interconnecting the plate members and against which the pad is supported.

17. The stabilizer pad of claim 1, wherein each plate member has a flange portion extending outwardly from at least one side edge thereof.

18. The stabilizer pad of claim 17, including a pair of side plates attached to lateral sides of the pad.

19. The stabilizer pad of claim 18, wherein each side plate has an elongated slot which is aligned with the passage in the pad.

20. The stabilizer pad of claim 19, wherein said mounting member comprises a mounting plate extending through the elongated slots in the pair of side plates.

21. The stabilizer pad of claim 20, wherein the pad is positionable between the pair of plate members with the pair of side plates abutting the inner surfaces of the pair of plate members and with the outer end portions of the mounting plate abutting respective flange portions of the pair of plate members.

22. The stabilizer pad of claim 21, wherein the fasteners are for removably connecting the outer end portions to the flange portions.

23. The stabilizer pad of claim 1, including a pair of side plates attached to lateral sides of the pad.

24. The stabilizer pad of claim 1, wherein said fasteners each comprise a bolt and nut.

25. The stabilizer pad of claim 1, comprising at least two mounting members, and said pad has at least two passages.

26. The stabilizer pad of claim 25, wherein both mounting members are mounting plates, and said passages are slots for accommodating respective mounting plates.

27. The stabilizer pad of claim 1, wherein said pad passage is disposed equidistant from said upper and lower surfaces.

28. The stabilizer pad of claim 1, wherein said mounting member comprises a rod, and said fasteners comprise a head and base of said rod.

29. The stabilizer pad of claim 28, including a plurality of rods spaced along said pad.

30. The stabilizer pad of claim 1, including a pair of right angle brackets associated respectively with said pair of plate members, each said bracket supporting an end portion.

31. The stabilizer pad of claim 1, including a base plate interconnecting said plate members, said plate members also carrying at least one grouser point disposed at a side of said plate member opposite to said pad.

32. The stabilizer pad of claim 31, wherein said plate members are rotatable about 180° to change from a pad surface to a grouser point surface engaging the ground.

33. The stabilizer pad of claim 1, wherein said fasteners comprise a pair of brackets associated respectively with said pair of plate members, each said bracket supporting an end portion.

34. The stabilizer pad for use with a stabilizer arm, the stabilizer pad assembly comprising:

a pair of laterally spaced apart plate members, each plate member having opposed inner and outer planar surfaces and at least three side edges, and each plate member having a flange portion extending outwardly at a right angle from at least one side edge of the outer planar surface, the pair of plate members being pivotally attached to the stabilizer arm by a pin extending laterally between the inner planar surfaces of the pair of plate members;

a resilient pad formed with upper and lower substantially planar surfaces, and with a passage extending transversely there though, a pair of side plates attached to lateral sides of the pad, each side plate having an elongated slot which is aligned with the passage in the pad; and a mounting plate extending through the elongated slots in the pair of side plates and the passage in the pad, the mounting plate having outer end portions projecting laterally beyond the pair of side plates, the pad being positionable between the pair of plate members with the pair of side plates abutting the inner planar surfaces of the pair of plate members and with the outer end portions of the mounting plate abutting respective flange portions of the pair of plate members, and fasteners for removably connecting the outer end portions to the flange portions, the pad being selectively reversible relative to the pair of plate members for permitting selective positioning of either the upper surface or the lower surface of the pad for use as a working surface for ground engagement.

35. The stabilizer pad of claim 34, including a cam arrangement for preventing inadvertent rotation of the pad about the pin.

36. The stabilizer pad of claim 34, including a pair of mounting plates and a pair of passages in the pad, with said side plates having corresponding elongated slots in alignment with the pair of passages in the pad.

* * * * *